(12) United States Patent
Mullen et al.

(10) Patent No.: US 10,176,423 B1
(45) Date of Patent: Jan. 8, 2019

(54) CARDS AND DEVICES WITH EMBEDDED HOLOGRAMS

(71) Applicant: Dynamics Inc., Cheswick, PA (US)

(72) Inventors: Jeffrey D. Mullen, Glenshaw, PA (US); Eric R. Nicklaus, Pittsburgh, PA (US)

(73) Assignee: DYNAMICS INC., Pittsburgh, PA (US)

( * ) Notice: Subject to any disclaimer, the term of this patent is extended or adjusted under 35 U.S.C. 154(b) by 0 days.

(21) Appl. No.: 15/665,666

(22) Filed: Aug. 1, 2017

Related U.S. Application Data

(63) Continuation of application No. 14/578,425, filed on Dec. 20, 2014, now Pat. No. 9,721,201, which is a continuation of application No. 14/030,712, filed on Sep. 18, 2013, now Pat. No. 8,944,333, which is a continuation of application No. 13/356,573, filed on Jan. 23, 2012, now Pat. No. 8,567,679.

(60) Provisional application No. 61/435,320, filed on Jan. 23, 2011.

(51) Int. Cl.
G06K 1/00 (2006.01)
G06K 19/16 (2006.01)
G06K 19/04 (2006.01)

(52) U.S. Cl.
CPC .......... *G06K 19/16* (2013.01); *G06K 19/042* (2013.01)

(58) Field of Classification Search
None
See application file for complete search history.

(56) References Cited

U.S. PATENT DOCUMENTS

| | | | |
|---|---|---|---|
| 4,353,064 A | 10/1982 | Stamm | |
| 4,394,654 A | 7/1983 | Hofmann-Cerfontaine | |
| 4,614,861 A | 9/1986 | Pavlov et al. | |
| 4,667,087 A | 5/1987 | Quintana | |
| 4,701,601 A | 10/1987 | Francini et al. | |
| 4,720,860 A | 1/1988 | Weiss | |
| 4,786,791 A | 11/1988 | Hodama | |
| 4,791,283 A | 12/1988 | Burkhardt | |
| 4,797,542 A | 1/1989 | Hara | |
| 4,889,366 A * | 12/1989 | Fabbiani | G06K 19/16 283/77 |

(Continued)

FOREIGN PATENT DOCUMENTS

| | | |
|---|---|---|
| JP | 05210770 A | 8/1993 |
| WO | WO9852735 | 11/1998 |

(Continued)

OTHER PUBLICATIONS

U.S. Appl. No. 60/594,300, Poidomani et al.

(Continued)

*Primary Examiner* — Christle I Marshall

(57) ABSTRACT

A card, such as a payment card, or other device may include an electronics package. The electronics package may include electronic components mounted on a flexible, printed circuit board. The electronics package may be laminated (e.g., via a hot, cold, or molding lamination process) between layers of transparent polymer. A hologram may be fixed to one side of the electronics package such that the hologram may be viewed from the exterior of the laminated card having transparent polymer layers. As such, the hologram may not be removed without breaching the integrity of a transparent polymer layer.

9 Claims, 6 Drawing Sheets

(56) References Cited

U.S. PATENT DOCUMENTS

| | | |
|---|---|---|
| 5,038,251 A | 8/1991 | Sugiyama et al. |
| 5,104,149 A | 4/1992 | Hoppe |
| 5,168,520 A | 12/1992 | Weiss |
| 5,237,614 A | 8/1993 | Weiss |
| 5,276,311 A | 1/1994 | Hennige |
| 5,347,580 A | 9/1994 | Molva et al. |
| 5,361,062 A | 11/1994 | Weiss et al. |
| 5,412,199 A | 5/1995 | Finkelstein et al. |
| 5,434,398 A | 7/1995 | Goldberg |
| 5,434,405 A | 7/1995 | Finkelstein et al. |
| 5,478,994 A | 12/1995 | Rahman |
| 5,479,512 A | 12/1995 | Weiss |
| 5,484,997 A | 1/1996 | Haynes |
| 5,485,519 A | 1/1996 | Weiss |
| 5,585,787 A | 12/1996 | Wallerstein |
| 5,591,949 A | 1/1997 | Bernstein |
| 5,608,203 A | 3/1997 | Finkelstein et al. |
| 5,623,552 A | 4/1997 | Lane |
| 5,657,388 A | 8/1997 | Weiss |
| 5,834,747 A | 11/1998 | Cooper |
| 5,834,756 A | 11/1998 | Gutman et al. |
| 5,856,661 A | 1/1999 | Finkelstein et al. |
| 5,864,623 A | 1/1999 | Messina et al. |
| 5,900,954 A | 5/1999 | Katz et al. |
| 5,907,142 A | 5/1999 | Kelsey |
| 5,913,203 A | 6/1999 | Wong et al. |
| 5,937,394 A | 8/1999 | Wong et al. |
| 5,955,021 A | 9/1999 | Tiffany, III |
| 5,956,699 A | 9/1999 | Wong et al. |
| 6,025,054 A | 2/2000 | Tiffany, III |
| 6,045,043 A | 4/2000 | Bashan et al. |
| 6,076,163 A | 6/2000 | Hoffstein et al. |
| 6,085,320 A | 7/2000 | Kaliski |
| 6,095,416 A | 8/2000 | Grant et al. |
| 6,130,621 A | 10/2000 | Weiss |
| 6,145,079 A | 11/2000 | Mitty et al. |
| 6,157,920 A | 12/2000 | Jakobsson et al. |
| 6,161,181 A | 12/2000 | Haynes, III et al. |
| 6,176,430 B1 | 1/2001 | Finkelstein et al. |
| 6,182,894 B1 | 2/2001 | Hackett et al. |
| 6,189,098 B1 | 2/2001 | Kaliski |
| 6,199,052 B1 | 3/2001 | Mitty et al. |
| 6,206,293 B1 | 3/2001 | Gutman et al. |
| 6,240,184 B1 | 5/2001 | Huynh et al. |
| 6,241,153 B1 | 6/2001 | Tiffany, III |
| 6,256,873 B1 | 7/2001 | Tiffany, III |
| 6,269,163 B1 | 7/2001 | Rivest et al. |
| 6,286,022 B1 | 9/2001 | Kaliski et al. |
| 6,308,890 B1 | 10/2001 | Cooper |
| 6,313,724 B1 | 11/2001 | Osterweil |
| 6,389,442 B1 | 5/2002 | Yin et al. |
| 6,393,447 B1 | 5/2002 | Jakobsson et al. |
| 6,411,715 B1 | 6/2002 | Liskov et al. |
| 6,446,052 B1 | 9/2002 | Juels |
| 6,460,141 B1 | 10/2002 | Olden |
| 6,592,044 B1 | 7/2003 | Wong et al. |
| 6,607,127 B2 | 8/2003 | Wong |
| 6,609,654 B1 | 8/2003 | Anderson et al. |
| 6,631,849 B2 | 10/2003 | Blossom |
| 6,655,585 B2 | 12/2003 | Shinn |
| 6,681,988 B2 | 1/2004 | Stack et al. |
| 6,705,520 B1 | 3/2004 | Pitroda et al. |
| 6,755,341 B1 | 6/2004 | Wong et al. |
| 6,764,005 B2 | 7/2004 | Cooper |
| 6,769,618 B1 | 8/2004 | Finkelstein |
| 6,805,288 B2 | 10/2004 | Routhenstein et al. |
| 6,811,082 B2 | 11/2004 | Wong |
| 6,813,354 B1 | 11/2004 | Jakobsson et al. |
| 6,817,532 B2 | 11/2004 | Finkelstein |
| 6,873,974 B1 | 3/2005 | Schutzer |
| 6,902,116 B2 | 6/2005 | Finkelstein |
| 6,970,070 B2 | 11/2005 | Juels et al. |
| 6,980,969 B1 | 12/2005 | Tuchler et al. |
| 6,985,583 B1 | 1/2006 | Brainard et al. |
| 6,991,155 B2 | 1/2006 | Burchette, Jr. |
| 7,013,030 B2 | 3/2006 | Wong et al. |
| 7,035,443 B2 | 4/2006 | Wong |
| 7,039,223 B2 | 5/2006 | Wong |
| 7,044,394 B2 | 5/2006 | Brown |
| 7,051,929 B2 | 5/2006 | Li |
| 7,083,094 B2 | 8/2006 | Cooper |
| 7,100,049 B2 | 8/2006 | Gasparini et al. |
| 7,100,821 B2 | 9/2006 | Rasti |
| 7,111,172 B1 | 9/2006 | Duane et al. |
| 7,114,652 B2 | 10/2006 | Moullette et al. |
| 7,136,514 B1 | 11/2006 | Wong |
| 7,140,550 B2 | 11/2006 | Ramachandran |
| 7,163,153 B2 | 1/2007 | Blossom |
| 7,195,154 B2 | 3/2007 | Routhenstein |
| 7,219,368 B2 | 5/2007 | Juels et al. |
| 7,225,537 B2 | 6/2007 | Reed |
| 7,225,994 B2 | 6/2007 | Finkelstein |
| 7,246,752 B2 | 7/2007 | Brown |
| 7,298,243 B2 | 11/2007 | Juels et al. |
| 7,334,732 B2 | 2/2008 | Cooper |
| 7,337,326 B2 | 2/2008 | Palmer et al. |
| 7,346,775 B2 | 3/2008 | Gasparini et al. |
| 7,356,696 B1 | 4/2008 | Jakobsson et al. |
| 7,357,319 B1 | 4/2008 | Lin et al. |
| 7,359,507 B2 | 4/2008 | Kaliski |
| 7,360,688 B1 | 4/2008 | Harris |
| 7,363,494 B2 | 4/2008 | Brainard et al. |
| 7,380,710 B2 | 6/2008 | Brown |
| 7,398,253 B1 | 7/2008 | Pinnell |
| 7,404,087 B2 | 7/2008 | Teunen |
| 7,424,570 B2 | 9/2008 | D'Albore et al. |
| 7,427,033 B1 | 9/2008 | Roskind |
| 7,454,349 B2 | 11/2008 | Teunen et al. |
| 7,461,250 B1 | 12/2008 | Duane et al. |
| 7,461,399 B2 | 12/2008 | Juels et al. |
| 7,472,093 B2 | 12/2008 | Juels |
| 7,472,829 B2 | 1/2009 | Brown |
| 7,494,055 B2 | 2/2009 | Fernandes et al. |
| 7,502,467 B2 | 3/2009 | Brainard et al. |
| 7,502,933 B2 | 3/2009 | Jakobsson et al. |
| 7,503,485 B1 | 3/2009 | Routhenstein |
| 7,516,492 B1 | 4/2009 | Nisbet et al. |
| 7,523,301 B2 | 4/2009 | Nisbet et al. |
| 7,530,495 B2 | 5/2009 | Cooper |
| 7,532,104 B2 | 5/2009 | Juels |
| 7,543,739 B2 | 6/2009 | Brown et al. |
| 7,559,464 B2 | 7/2009 | Routhenstein |
| 7,562,221 B2 | 7/2009 | Nystrom et al. |
| 7,562,222 B2 | 7/2009 | Gasparini et al. |
| 7,580,898 B2 | 8/2009 | Brown et al. |
| 7,584,153 B2 | 9/2009 | Brown et al. |
| 7,591,426 B2 | 9/2009 | Osterweil et al. |
| 7,591,427 B2 | 9/2009 | Osterweil |
| 7,602,904 B2 | 10/2009 | Juels et al. |
| 7,631,804 B2 | 12/2009 | Brown |
| 7,639,537 B2 | 12/2009 | Sepe et al. |
| 7,641,124 B2 | 1/2010 | Brown et al. |
| 7,660,902 B2 | 2/2010 | Graham et al. |
| 7,828,207 B2 | 11/2010 | Cooper |
| 7,975,914 B2 | 7/2011 | Daniel |
| 8,092,886 B2 | 1/2012 | McKillip |
| 8,387,886 B2 * | 3/2013 | Tompkin ............... G07D 7/00 235/488 |
| 9,346,304 B2 | 5/2016 | Peinze et al. |
| 2001/0034702 A1 | 10/2001 | Mockett et al. |
| 2001/0047335 A1 | 11/2001 | Arndt et al. |
| 2002/0059114 A1 | 5/2002 | Cockrill et al. |
| 2002/0082989 A1 | 6/2002 | Fife et al. |
| 2002/0096570 A1 | 7/2002 | Wong et al. |
| 2002/0120583 A1 | 8/2002 | Keresman, III et al. |
| 2003/0034388 A1 | 2/2003 | Routhenstein et al. |
| 2003/0052168 A1 | 3/2003 | Wong |
| 2003/0057278 A1 | 3/2003 | Wong |
| 2003/0062716 A1 | 4/2003 | Curiel |
| 2003/0116635 A1 | 6/2003 | Taban |
| 2003/0152253 A1 | 8/2003 | Wong |
| 2003/0163287 A1 | 8/2003 | Vock et al. |
| 2003/0173409 A1 | 9/2003 | Vogt et al. |
| 2003/0179909 A1 | 9/2003 | Wong et al. |

(56) References Cited

U.S. PATENT DOCUMENTS

| | | |
|---|---|---|
| 2003/0179910 A1 | 9/2003 | Wong |
| 2003/0226899 A1 | 12/2003 | Finkelstein |
| 2004/0035942 A1 | 2/2004 | Silverman |
| 2004/0054574 A1 | 3/2004 | Kaufman et al. |
| 2004/0133787 A1 | 7/2004 | Doughty |
| 2004/0150220 A1 | 8/2004 | Holmes et al. |
| 2004/0162732 A1 | 8/2004 | Rahim et al. |
| 2004/0172535 A1 | 9/2004 | Jakobsson |
| 2004/0177045 A1 | 9/2004 | Brown |
| 2005/0043997 A1 | 2/2005 | Sohata et al. |
| 2005/0080747 A1 | 4/2005 | Anderson et al. |
| 2005/0086160 A1 | 4/2005 | Wong et al. |
| 2005/0086177 A1 | 4/2005 | Anderson et al. |
| 2005/0116026 A1 | 6/2005 | Burger et al. |
| 2005/0119940 A1 | 6/2005 | Concilio et al. |
| 2005/0154643 A1 | 7/2005 | Doan et al. |
| 2005/0228959 A1 | 10/2005 | D'Albore et al. |
| 2006/0000900 A1 | 1/2006 | Fernandes et al. |
| 2006/0037073 A1 | 2/2006 | Juels et al. |
| 2006/0041759 A1 | 2/2006 | Kaliski et al. |
| 2006/0085328 A1 | 4/2006 | Cohen et al. |
| 2006/0091223 A1 | 5/2006 | Zellner |
| 2006/0161435 A1 | 7/2006 | Atef et al. |
| 2006/0163353 A1 | 7/2006 | Moulette et al. |
| 2006/0174104 A1 | 8/2006 | Crichton et al. |
| 2006/0196931 A1 | 9/2006 | Holtmanns et al. |
| 2006/0226238 A1 | 10/2006 | Salib et al. |
| 2006/0256961 A1 | 11/2006 | Brainard et al. |
| 2007/0013983 A1 | 1/2007 | Kitamura et al. |
| 2007/0034700 A1 | 2/2007 | Poidomani et al. |
| 2007/0114274 A1 | 5/2007 | Gibbs et al. |
| 2007/0124321 A1 | 5/2007 | Szydlo |
| 2007/0152070 A1 | 7/2007 | D'Albore |
| 2007/0152072 A1 | 7/2007 | Frallicciardi et al. |
| 2007/0153487 A1 | 7/2007 | Frallicciardi et al. |
| 2007/0174614 A1 | 7/2007 | Duane et al. |
| 2007/0192249 A1 | 8/2007 | Biffle et al. |
| 2007/0241183 A1 | 10/2007 | Brown et al. |
| 2007/0241201 A1 | 10/2007 | Brown et al. |
| 2007/0256123 A1 | 11/2007 | Duane et al. |
| 2007/0291753 A1 | 12/2007 | Romano |
| 2008/0005510 A1 | 1/2008 | Sepe et al. |
| 2008/0008315 A1 | 1/2008 | Fontana et al. |
| 2008/0008322 A1 | 1/2008 | Fontana et al. |
| 2008/0010675 A1 | 1/2008 | Massascusa et al. |
| 2008/0016351 A1 | 1/2008 | Fontana et al. |
| 2008/0019507 A1 | 1/2008 | Fontana et al. |
| 2008/0028447 A1 | 1/2008 | O'Malley et al. |
| 2008/0040271 A1 | 2/2008 | Hammad et al. |
| 2008/0040276 A1 | 2/2008 | Hammad et al. |
| 2008/0058016 A1 | 3/2008 | Di Maggio et al. |
| 2008/0059379 A1 | 3/2008 | Ramaci et al. |
| 2008/0096326 A1 | 4/2008 | Reed |
| 2008/0126398 A1 | 5/2008 | Cimino |
| 2008/0128515 A1 | 6/2008 | Di Iorio |
| 2008/0148394 A1 | 6/2008 | Poidomani et al. |
| 2008/0169640 A1 | 7/2008 | Scheir |
| 2008/0201264 A1 | 8/2008 | Brown et al. |
| 2008/0209550 A1 | 8/2008 | Di Iorio |
| 2008/0245865 A1* | 10/2008 | Mosteller ............... B42D 25/00 235/449 |
| 2008/0288699 A1 | 11/2008 | Chichierchia |
| 2008/0294930 A1 | 11/2008 | Varone et al. |
| 2008/0302877 A1 | 12/2008 | Musella et al. |
| 2009/0013122 A1 | 1/2009 | Sepe et al. |
| 2009/0036147 A1 | 2/2009 | Romano |
| 2009/0046522 A1 | 2/2009 | Sepe et al. |
| 2009/0108064 A1 | 4/2009 | Fernandes et al. |
| 2009/0150295 A1 | 6/2009 | Hatch et al. |
| 2009/0152365 A1 | 6/2009 | Li et al. |
| 2009/0159698 A1 | 6/2009 | Mullen |
| 2009/0159700 A1 | 6/2009 | Mullen |
| 2009/0242648 A1 | 10/2009 | Di Sirio et al. |
| 2009/0244858 A1 | 10/2009 | Di Sirio et al. |
| 2009/0253460 A1 | 10/2009 | Varone et al. |
| 2009/0255996 A1 | 10/2009 | Brown et al. |
| 2009/0277678 A1* | 11/2009 | Kuwabara ............... C09J 163/00 174/260 |
| 2009/0290704 A1 | 11/2009 | Cimino |
| 2009/0303885 A1 | 12/2009 | Longo |
| 2010/0310812 A1* | 12/2010 | Muth ................... B32B 37/142 428/76 |
| 2011/0028184 A1 | 2/2011 | Cooper |
| 2011/0057029 A1* | 3/2011 | Daniel ................... G06K 17/00 235/380 |
| 2011/0227326 A1 | 9/2011 | Elgar et al. |
| 2012/0241523 A1* | 9/2012 | Poidomani ......... G06K 19/0702 235/492 |
| 2012/0286504 A1* | 11/2012 | Oikawa ............... G03H 1/0011 283/85 |
| 2016/0282810 A1 | 9/2016 | Motoi |

FOREIGN PATENT DOCUMENTS

| | | |
|---|---|---|
| WO | WO0247019 | 6/2002 |
| WO | WO06066322 | 6/2006 |
| WO | WO06080929 | 8/2006 |
| WO | WO06105092 | 10/2006 |
| WO | WO06116772 | 11/2006 |
| WO | WO08064403 | 6/2008 |

OTHER PUBLICATIONS

U.S. Appl. No. 60/675,388, Poidomani et al.
The Bank Credit Card Business. Second Edition, American Bankers Association, Washington, D.C., 1996.
A Day in the Life of a Flux Reversal. http://www.phrack.org/issues. html?issue=37&id=6#article As viewed on Apr. 12, 2010.
Dynamic Virtual Credit Card Numbers. http://homes.cerias.purdue. edu/~jtli/paper/fc07.pdf. As viewed on Apr. 12, 2010.
English translation of JP 05210770 A.

* cited by examiner

CARDS AND DEVICES WITH EMBEDDED HOLOGRAMS

CROSS-REFERENCE TO RELATED APPLICATION

This application is a continuation of U.S. patent application Ser. No. 14/578,425 filed Dec. 20, 2014, which is a continuation of U.S. patent application Ser. No. 14/030,712 filed Sep. 18, 2013, which is a continuation of U.S. patent application Ser. No. 13/356,573 filed Jan. 23, 2012, which claims the benefit of U.S. Provisional Patent Application No. 61/435,320, titled "CARDS AND DEVICES WITH EMBEDDED HOLOGRAMS," filed Jan. 23, 2011, each of which is hereby incorporated by reference herein in its entirety.

BACKGROUND OF THE INVENTION

This invention relates to magnetic cards and devices and associated payment systems.

SUMMARY OF THE INVENTION

A card may include a dynamic magnetic communications device. Such a dynamic magnetic communications device may take the form of a magnetic encoder or a magnetic emulator. A magnetic encoder may change the information located on a magnetic medium such that a magnetic stripe reader may read changed magnetic information from the magnetic medium. A magnetic emulator may generate electromagnetic fields that directly communicate data to a magnetic stripe reader. Such a magnetic emulator may communicate data serially to a read-head of the magnetic stripe reader.

All, or substantially all, of the front as well as the back of a card may be a display (e.g., bi-stable, non bi-stable, LCD, or electrochromic display). Electrodes of a display may be coupled to one or more capacitive touch sensors such that a display may be provided as a touch-screen display. Any type of touch-screen display may be utilized. Such touch-screen displays may be operable of determining multiple points of touch. A barcode, for example, may be displayed across all, or substantially all, of a surface of a card. In doing so, computer vision equipment such as barcode readers may be less susceptible to errors in reading a displayed barcode.

A card may include a number of output devices to output dynamic information. For example, a card may include one or more RFIDs or IC chips to communicate to one or more RFID readers or IC chip readers, respectively. A card may include devices to receive information. For example, an RFID and IC chip may both receive information and communicate information to an RFID and IC chip reader, respectively. A card may include a central processor that communicates data through one or more output devices simultaneously (e.g., an RFID, IC chip, and a dynamic magnetic stripe communications device). The central processor may receive information from one or more input devices simultaneously (e.g., an RFID, IC chip, and dynamic magnetic stripe devices). A processor may be coupled to surface contacts such that the processor may perform the processing capabilities of, for example, an EMV chip. The processor may be laminated over and not exposed such that such a processor is not exposed on the surface of the card.

A card may be provided with a button in which the activation of the button causes a code to be communicated through a dynamic magnetic stripe communications device (e.g., the subsequent time a read-head detector on the card detects a read-head). The code may be indicative of, for example, a payment option. The code may be received by the card via manual input (e.g., onto buttons of the card).

A magnetic emulator may include a coil. Inside the coil, one or more strips of a material (e.g., a magnetic or non-magnetic material) may be provided. Outside of the coil, one or more strips of a material (e.g., a magnetic or non-magnetic material) may be provided.

A card may be formed by providing an electronic assembly between two layers of transparent polymer, injecting a liquid laminate between those two layers, and then hardening the liquid laminate. The liquid laminate may also be, for example, transparent. The liquid laminate may be hardened via, for example, a chemical, temperature, optical (e.g., UV or low-band blue light), or any other method.

A security hologram may be attached to the electronic assembly. For example, a security hologram may be fixed to a surface of a flexible, printed circuit board. The hologram may be viewable through, for example, a layer of transparent polymer and a transparent liquid laminate later hardened that is provided between the hologram and the exterior of the card. Printing may occur on the surface of the transparent layer of polymer above the security hologram. Such printing may take many forms, such as an acrylic-based printing material. A liquid material may be dropped (e.g., via drop-on-demand printing) on the layer of transparent polymer and later hardened (e.g., via a UV or low-band blue light). The printing material may not be provided over an area where the security hologram may be perceived. In doing so, for example, the security hologram may be viewable as being embedded in a card. In this manner, a user may not remove the hologram, for example, without breaching the integrity of a layer of transparent polymer and the card. Print material may be provided over a layer of transparent material that resides over a security hologram. The print material may be provided as written indicia (e.g., a name or logo of a payment network) or may be provided as indicia to hide a portion of the security hologram to, for example, make the security hologram be perceived as having a particular shape. Print material may be provided directly on a security hologram so that the print material is protected by a layer of transparent polymer.

A security hologram may be, for example, fixed to an object (e.g., a surface of a flexible, printed circuit board) via an adhesive such as a glue or an adhesive tape. A glue may, for example, provide for an adhesive applicable through a liquid dispersing device. An adhesive tape, for example, may provide a surface of uniform thickness such that the hologram may retain a flat surface. A hologram may be provided with the image of a logo of a payment network, a payment card issuer, or any company. A barcode may be printed on a printed circuit board, a layer of transparent polymer (e.g., a layer that a hologram is located under), or on a print material. A layer of transparent polymer may, for example, be a layer of transparent PVC or a layer of transparent non-PVC material.

BRIEF DESCRIPTION OF THE DRAWINGS

The principles and advantages of the present invention can be more clearly understood from the following detailed description considered in conjunction with the following drawings, in which the same reference numerals denote the same structural elements throughout, and in which.

DETAILED DESCRIPTION OF THE INVENTION

Figure 1:
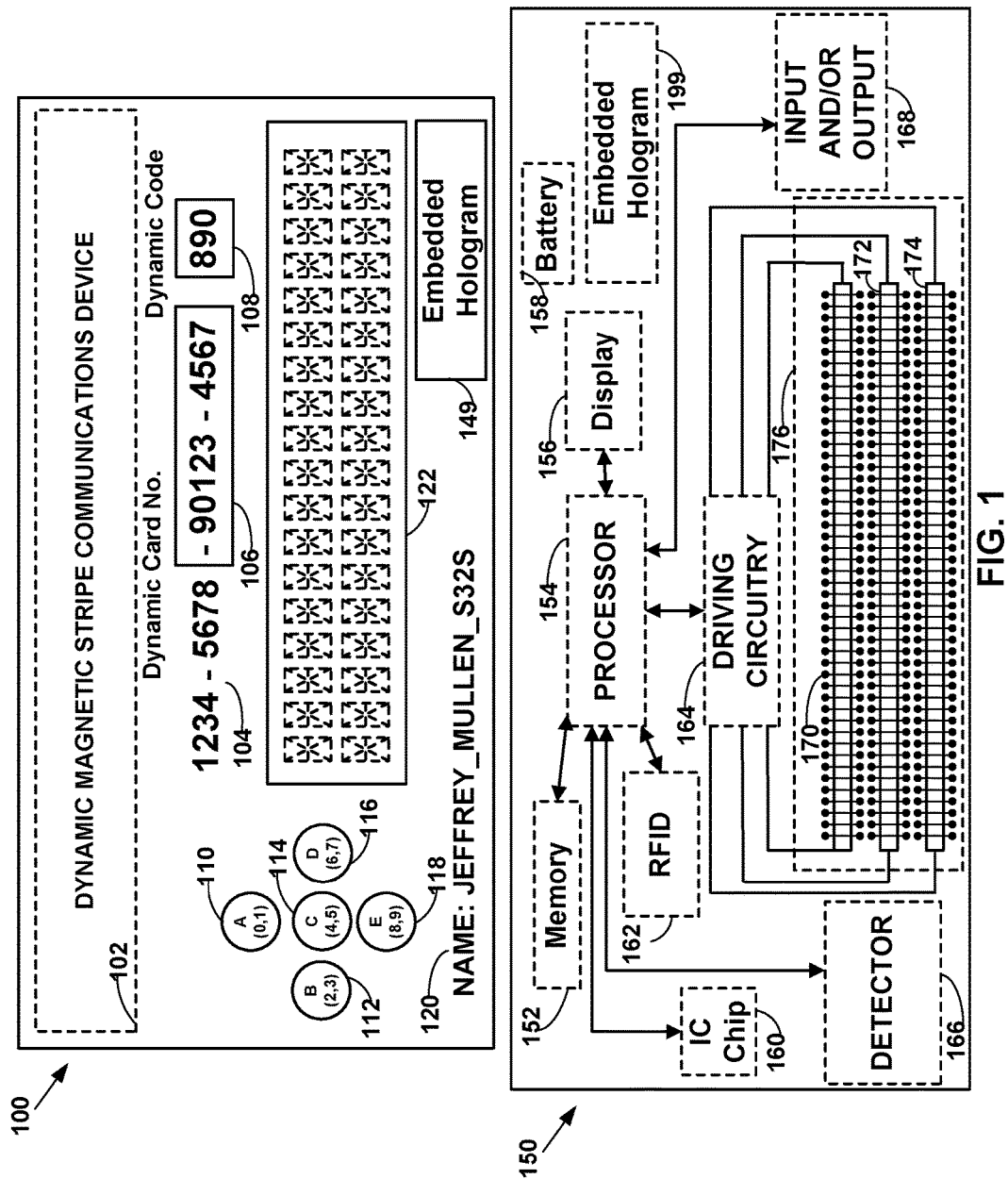
FIG. 1 is an illustration of cards constructed in accordance with the principles of the present invention.

FIG. 1 shows card 100 that may include, for example, a dynamic number that may be entirely, or partially, displayed using a display (e.g., display 106). A dynamic number may include a permanent portion such as, for example, permanent portion 104 and a dynamic portion such as, for example, dynamic portion 106. Card 100 may include a dynamic number having permanent portion 104 and permanent portion 104 may be incorporated on card 100 so as to be visible to an observer of card 100. For example, labeling techniques, such as printing, embossing, laser etching, etc., may be utilized to visibly implement permanent portion 104.

Card 100 may include a second dynamic number that may also be entirely, or partially, displayed via a second display (e.g., display 108). Display 108 may be utilized, for example, to display a dynamic code such as a dynamic security code. Card 100 may also include third display 122 that may be used to display graphical information, such as logos and barcodes. Third display 122 may also be utilized to display multiple rows and/or columns of textual and/or graphical information.

Persons skilled in the art will appreciate that any one or more of displays 106, 108, and/or 122 may be implemented as a bi-stable display. For example, information provided on displays 106, 108, and/or 122 may be stable in at least two different states (e.g., a powered-on state and a powered-off state). Any one or more of displays 106, 108, and/or 122 may be implemented as a non-bi-stable display. For example, the display is stable in response to operational power that is applied to the non-bi-stable display. Other display types, such as LCD or electrochromic, may be provided as well.

Other permanent information, such as permanent information 120, may be included within card 100, which may include user specific information, such as the cardholder's name or username. Permanent information 120 may, for example, include information that is specific to card 100 (e.g., a card issue date and/or a card expiration date). Information 120 may represent, for example, information that includes information that is both specific to the cardholder, as well as information that is specific to card 100.

Card 100 may accept user input data via any one or more data input devices, such as buttons 110-118. Buttons 110-118 may be included to accept data entry through mechanical distortion, contact, or proximity. Buttons 110-118 may be responsive to, for example, induced changes and/or deviations in light intensity, pressure magnitude, or electric and/or magnetic field strength. Such information exchange may be determined and processed by card 100 as data input. Embedded hologram 149 may be provided beneath at least a layer of transparent polymer (e.g., transparent PVC) to protect the hologram from the environment.

Card 100 may be implemented using architecture 150, which may include one or more processors 154. One or more processors 154 may be configured to utilize external memory 152, internal memory, or a combination of external memory 152 and internal memory for dynamically storing information, such as executable machine language, related dynamic machine data, and user input data values.

One or more of the components shown in architecture 150 may be configured to transmit information to processor 154 and/or may be configured to receive information as transmitted by processor 154. For example, one or more displays 156 may be coupled to receive data from processor 154. The data received from processor 154 may include, for example, at least a portion of dynamic numbers and/or dynamic codes. The data to be displayed on the display may be displayed on one or more displays 156.

One or more displays 156 may, for example, be touch sensitive and/or proximity sensitive. For example, objects such as fingers, pointing devices, etc., may be brought into contact with displays 156, or in proximity to displays 156. Detection of object proximity or object contact with displays 156 may be effective to perform any type of function (e.g., provide particular data to processor 154). Displays 156 may have multiple locations that are able to be determined as being touched, or determined as being in proximity to an object.

Input and/or output devices may be implemented within architecture 150. For example, integrated circuit (IC) chip 160 (e.g., an EMV chip) may be included on a card (e.g., card 100 of FIG. 1), that can communicate information with a chip reader (e.g., an EMV chip reader). Radio frequency identification (RFID) module 162 may be included within a card (e.g., card 100 of FIG. 1) to enable the exchange of information between an RFID reader and a card (e.g., card 100 of FIG. 1).

Other input and/or output devices 168 may be included within architecture 150, for example, to provide any number of input and/or output capabilities on a card (e.g., card 100 of FIG. 1). For example, other input and/or output devices 168 may include an audio device capable of receiving and/or transmitting audible information.

Other input and/or output devices 168 may include a device that exchanges analog and/or digital data using a visible data carrier. Other input and/or output devices 168 may include a device, for example, that is sensitive to a non-visible data carrier, such as an infrared data carrier or electromagnetic data carrier.

Persons skilled in the art will appreciate that a card (e.g., card 100 of FIG. 1) may, for example, be a self-contained device that derives its own operational power from one or more batteries 158. Furthermore, one or more batteries 158 may be included, for example, to provide operational power to a card (e.g., card 100 of FIG. 1) for a number of years (e.g., approximately 2 years). One or more batteries 158 may be included, for example, as rechargeable batteries.

Dynamic magnetic stripe communications device 102 may be included on card 100 to communicate information to, for example, a read-head of a magnetic stripe reader via, for example, electromagnetic signals. For example, electromagnetic field generators 170-174 may be included to communicate one or more tracks of electromagnetic data to read-heads of a magnetic stripe reader. Electromagnetic field generators 170-174 may include, for example, a series of electromagnetic elements, where each electromagnetic element may be implemented as a coil wrapped around one or more materials (e.g., a magnetic material and/or a non-magnetic material). Additional materials may be placed outside the coil (e.g., a magnetic material and/or a non-magnetic material).

Electrical excitation by processor 154 of one or more coils of one or more electromagnetic elements via, for example, driving circuitry 164 may be effective to generate electromagnetic fields from one or more electromagnetic elements. One or more electromagnetic field generators 170-174 may be utilized to communicate electromagnetic information to, for example, one or more read-heads of a magnetic stripe reader.

Timing aspects of information exchange between a card and the various I/O devices implemented on a card may be determined by a card (e.g., card 100 of FIG. 1). One or more detectors 166 may be utilized, for example, to sense the proximity, mechanical distortion, or actual contact, of an external device, which in turn, may trigger the initiation of a communication sequence. The sensed presence or touch of the external device may then be communicated to a controller (e.g., processor 154), which in turn may direct the exchange of information between a card (e.g., card 100 of FIG. 1) and the external device. The sensed presence, mechanical distortion, or touch of the external device may be effective to, for example, determine the type of device or object detected.

For example, the detection may include the detection of, for example, a read-head housing of a magnetic stripe reader. In response, processor 154 may activate one or more electromagnetic field generators 170-174 to initiate a communications sequence with, for example, one or more read-heads of a magnetic stripe reader. The timing relationships associated with communications to one or more electromagnetic field generators 170-174 and one or more read-heads of a magnetic stripe reader may be provided through use of the detection of the magnetic stripe reader.

Persons skilled in the art will appreciate that processor 154 may provide user-specific and/or card-specific information through utilization of any one or more buttons (e.g., buttons 110-118 of FIG. 1), RFID 162, IC chip 160, electromagnetic field generators 170-174, and other input and/or output devices 168.

Embedded hologram 199 may be provided. Embedded hologram 199 may be fixed to, for example, a printed circuit board that is flexible that includes conductive traces (e.g., copper traces) between the electrical elements of architecture 150.

Figure 2:
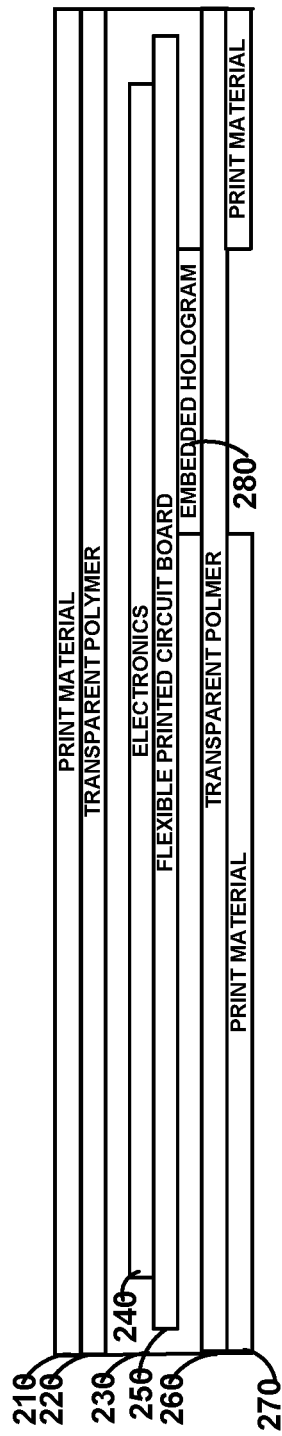
FIG. 2 is an illustration of a card constructed in accordance with the principles of the present invention.

FIG. 2 shows card 200 that may include, for example, print material 210, transparent polymer 220, laminate 230, electronics 240, flexible printed circuit board 250, transparent polymer 260, print material 270, and embedded hologram 280. Laminate 230 may be provided between, for example, embedded hologram 280 and transparent polymer 260.

The thickness of card 200 may be, for example, between approximately 30 thousandths of an inch thick and approximately 33 thousandths of an inch thick. Print material layers 210 and 270 may be, for example, between approximately one half of a thousandth of an inch thick and two thousandths of an inch thick. Transparent polymer layers 220 and 260 may be, for example, between 4 and 5 thousandths of an inch thick. Electronics 240, flexible printed circuit board 250, hologram 280, and laminate 230 may be, for example, between 16 and 22 thousandths of an inch thick.

Figure 3:
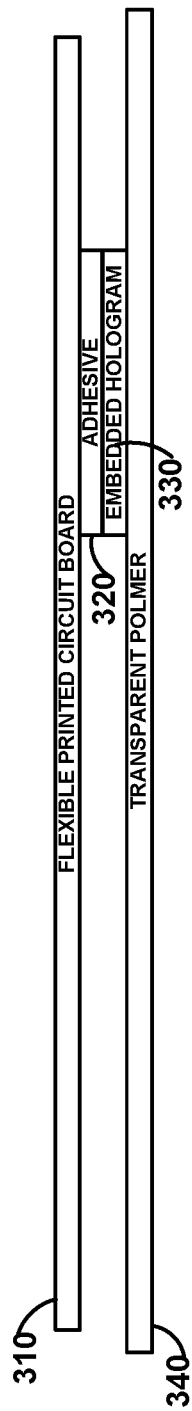
FIG. 3 is an illustration of a card constructed in accordance with the principles of the present invention.

FIG. 3 shows card 300 that may include, for example, flexible printed circuit board 310, adhesive 320, embedded hologram 330, and transparent polymer 340.

Holograms 330 may be provided in a strip form. The strip of holograms may be cut, for example, by an automated cutting machine.

An automated adhesive application machine may apply, for example, adhesive 320 to flexible printed circuit board 310. Tape-based adhesive may be provided in strip form. An automated machine may cut such strip and pick and place the cut strips to flexible printed circuit board 310.

An automated hologram application machine may, for example, apply (e.g., pick and place) hologram 330 to adhesive 320.

The automated machines provided herein may be, for example, provided as any number of machines. For example, the automated machines may be provided as a single automated machine.

Figure 4:
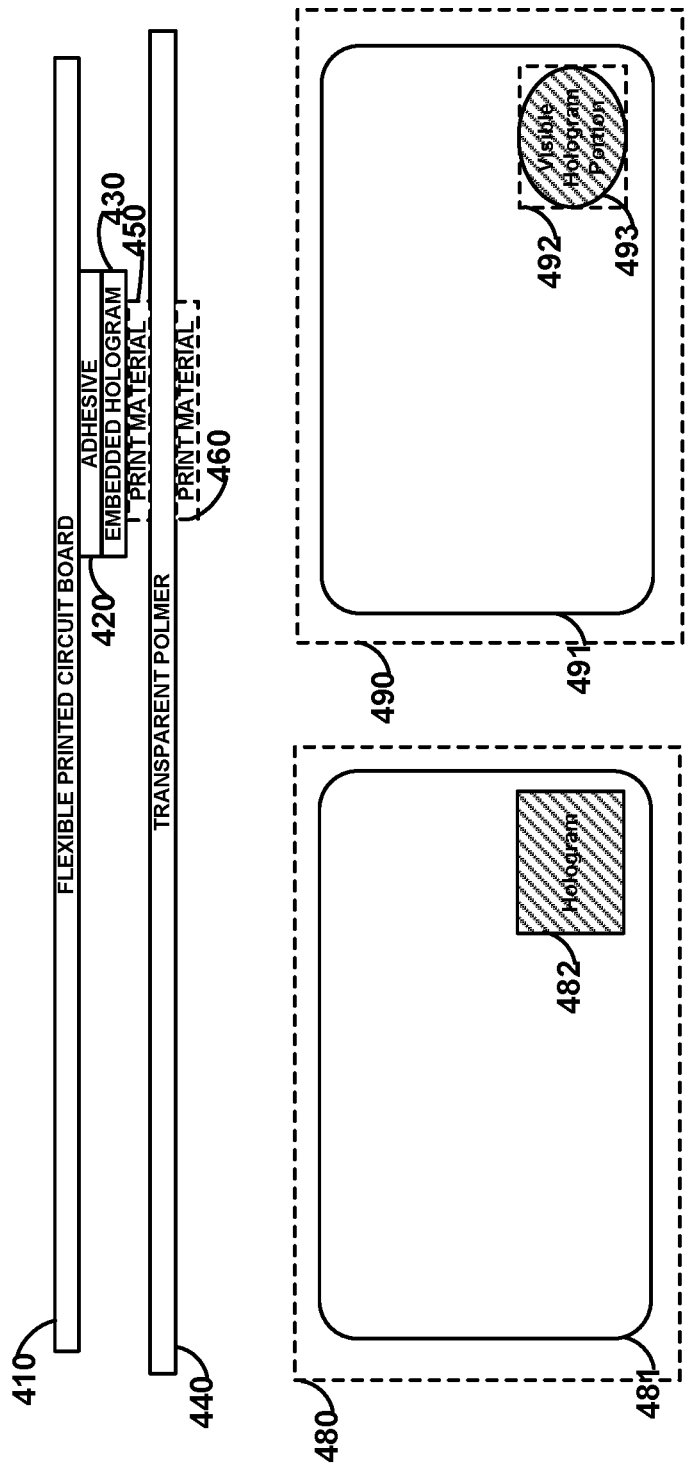
FIG. 4 is an illustration of a card portion constructed in accordance with the principles of the present invention.

FIG. 4 shows card portion 400 that may include, for example, flexible printed circuit board 410, adhesive 420, embedded hologram 430, print material 450, transparent polymer 440, and print material 460. Card portion 400 may, for example, be indicative of perspective 480 in which hologram 482 is viewable from the exterior of card 481. Card portion 400 may, for example, be indicative of perspective 490 in which hologram 492 is particularly printed over so that visible hologram portion 493 is viewable from the exterior of card 491.

At least a portion of electronic circuitry may be assembled to a printed circuit board in a particular facility in a particular country. One or more holograms may be applied to the printed circuit board at that facility. The partially assembled printed circuit board may be shipped to a different facility in a different country. Assembly of the printed circuit board may be completed at this different particular facility. Multiple printed circuit boards may be included in a card and may be electrically and mechanically coupled together. One or more holograms may be applied to either of these printed circuit boards at this different facility. Lamination of the cards as well as pre-printing of branding information may occur at this different facility. Pre-printed laminated cards may be shipped to yet another facility where, for example, one or more holograms may be provided on the surface of the card and personalization printing may occur.

Personalization printing may include, for example, the printing of at least one cardholder's name, payment card number, expiration date, and security code to a card. Other forms of personalization may occur such as, for example, programming of a chip provided in the card with personal data such as, for example, multiple tracks of magnetic stripe data or other chip-related data. The board assembly, hologram application, lamination, printing, personalization, and other processes discussed herein may be provided at several facilities in several countries (e.g., four facilities in three countries) or in a single facility in one country. After a card is personalized, for example, the card may be attached to a mailing medium and mailed in an envelope to a customer.

Figure 5:
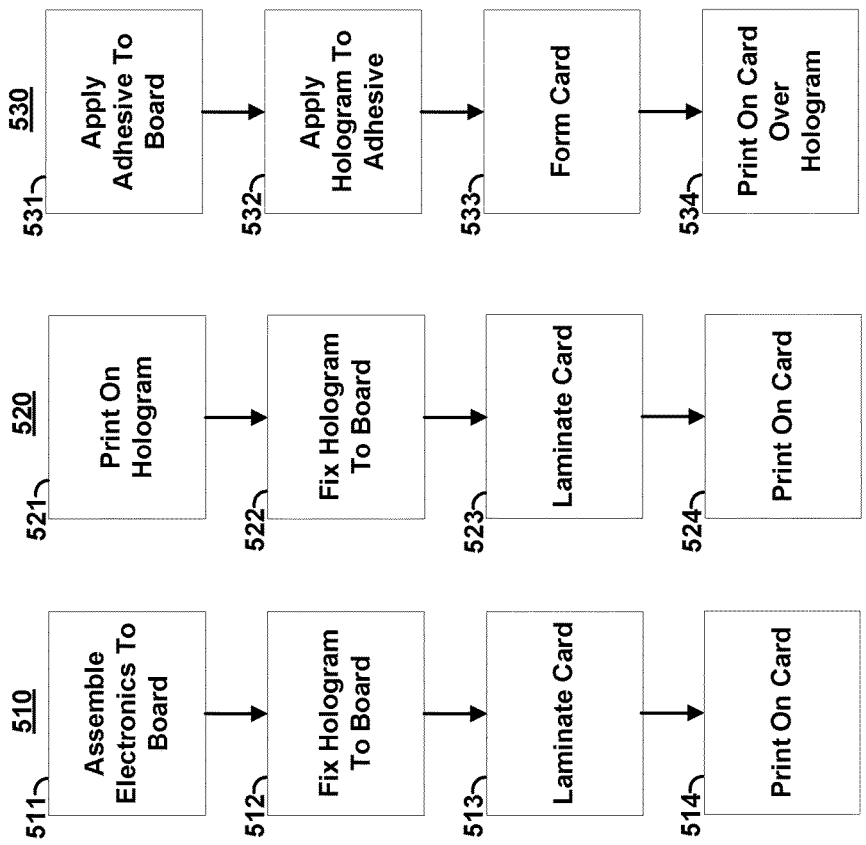
FIG. 5 is a flow chart of processes constructed in accordance with the principles of the present invention.

FIG. 5 shows flow charts 510, 520, and 530. Flow chart 510 may include, for example, step 511, in which electronics are assembled to a board. One or more holograms may be fixed to the board in step 512, a card may be laminated with the electronics and board embedded in the card in step 513, and the card may be printed in step 514.

Flow chart 520 may include, for example, step 521, in which print material may be provided on a hologram. The hologram with the printing may be fixed to a board in step 522. A card may be laminated in step 523. A card may be printed in step 524.

Flow chart 530 may be provided and may include step 531, where an adhesive is applied to a board. A hologram may be applied to the adhesive in step 532. A card may be formed in step 533. The card may be printed and printing may occur over the area where the hologram may be perceived outside the card in step 534.

Persons skilled in the art will appreciate that a layer of transparent polymer may have a first transparency before a card is formed and a second transparency after the card is formed. The layer of transparent polymer may, for example, be more transparent after the card is formed than before the card is formed.

Figure 6:
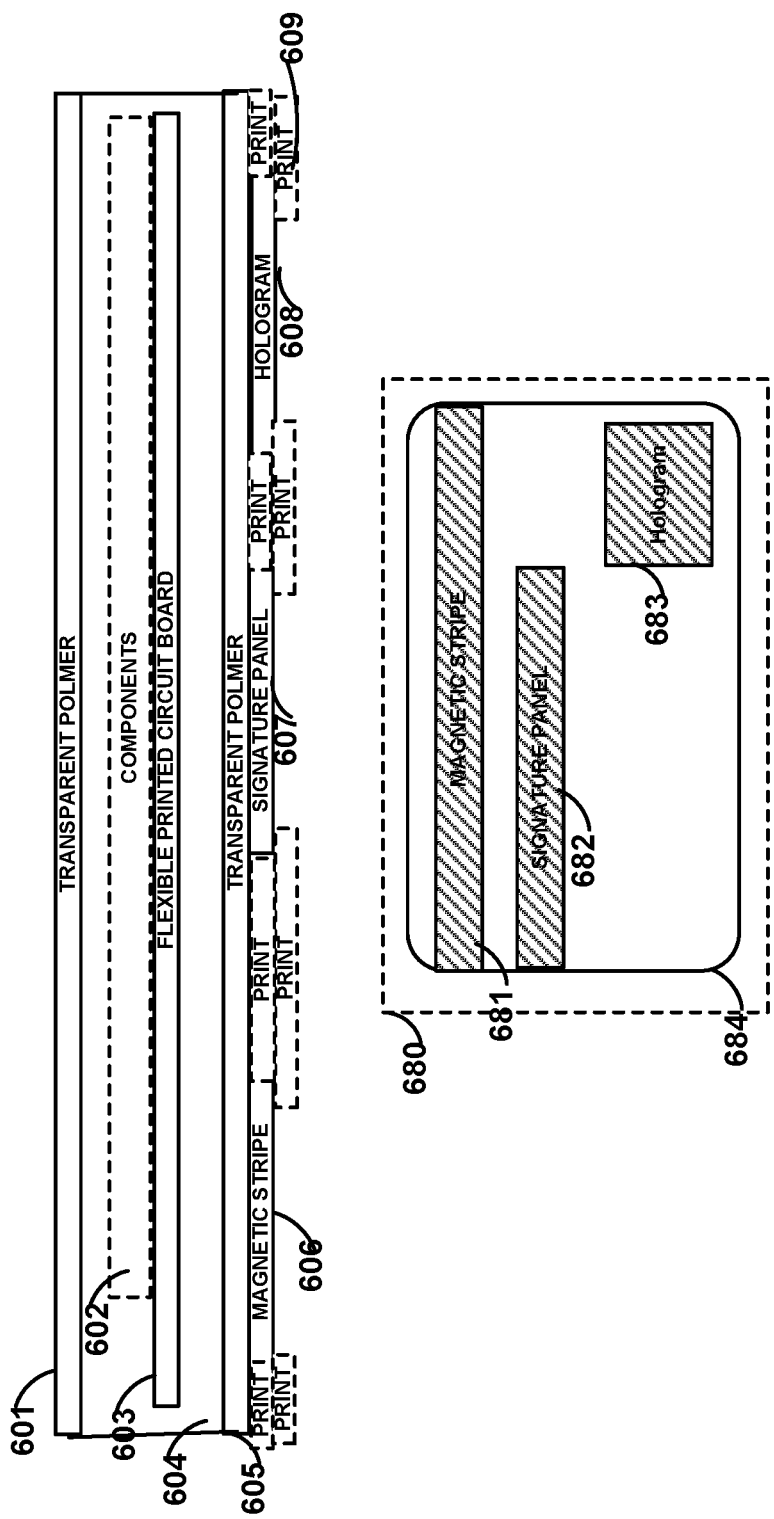
FIG. 6 is an illustration of a card portion constructed in accordance with the principles of the present invention.

FIG. 6 shows card 600 that may be configured as configuration 680. Particularly, a card may include one or more magnetic stripes, signature panels, and/or holograms that are affixed to a polymer (e.g., a transparent polymer) surface of a card and then at least partially printed over (e.g., via the deposition of print material that is later hardened by a light-based reaction).

Card 600 may include transparent polymer 601, electrical and/or mechanical components 602, flexible printed circuit board 603, laminate 604, transparent polymer 605, magnetic stripe 606. Signature panel 607, hologram 608, and print material 609. Components 602 may include, for example, one or more batteries, reader communication devices, processors, buttons, capacitive sensors, light sensors (e.g., visible light and/or infrared sensors, sources of light, or any other components). Persons skilled in the art will appreciate that a user may press a button on a device (e.g., card 600) and pre-determined information stored in a memory of the device may be retrieved based on the selected button and communicated to a device reader (e.g., via a dynamic magnetic stripe communications device, a radio-frequency identification antenna such an a near-field-communication antenna, and/or an exposed contact chip such as an EMV chip). A liquid laminate may be utilized and poured over components 602 and may be hardened between polymer 601 and 605 via a reaction process. The reaction process may be, for example, chemical, temperature, light-based, time-based, pressure-based, and/or air-based in nature.

Persons skilled in the art will appreciate that any number of magnetic stripes, signature panels, and/or holograms may be affixed directly to a layer of material (e.g., polymer 601) of card 600 including the print material. The print material may be provided over a portion of a magnetic stripe, signature panel, and/or holograms. In doing so, the edges of the magnetic stripe, signature panel, and/or hologram may not be exposed. Accordingly, the strength of such structures may be increased. An adhesive may be utilized, for example, to affix a magnetic stripe, signature panel, hologram, and/or other structures to a layer of material (e.g., a print material or layer of transparent or non-transparent polymer). Such an adhesive may be pre-applied to a structure. A structure such as, for example, a magnetic stripe, signature panel, and/or hologram may be affixed via a pre-determined temperature and pre-determined pressure for a pre-determined amount of time.

Configuration 680 may include magnetic stripe 681, signature panel 682, and hologram 683 in card, or other device, 684. A magnetic stripe, signature panel 682, and hologram 683 may be provided on the same surface of a card or may be provided on different surfaces of a card. For example, a magnetic stripe and signature panel may be provided on a reverse side of a card while a hologram is provided on the obverse side of a card. A hologram may be provided, for example, on both sides of a card. A device, for example, with a dynamic magnetic stripe communications device that can send different information to a magnetic stripe reader may, for example, not have a magnetic stripe. Holograms may be of a particular shape (e.g., rectangular) and may be printed over with print material so the hologram is observable from outside the card has having a different shape (e.g., oval) as the different shape portion viewable as a hologram. Print material may, for example, be provided over a rectangular hologram such that the viewable portion of the rectangular hologram has rounded corners. A signature panel may be aligned against a side of the card or may be centered horizontally, vertically, or centered horizontally and vertically on a surface of the card. Material viewable outside of visible light (e.g., viewable under an ultraviolet light) may be added to any surface of the device (e.g., card 600). Such material may, for example, increase the security of the device by increasing the complexity to counterfeit such a device.

Persons skilled in the art will also appreciate that the present invention is not limited to only the embodiments described. Instead, the present invention more generally involves dynamic information. Persons skilled in the art will also appreciate that the apparatus of the present invention may be implemented in ways other than those described herein. All such modifications are within the scope of the present invention, which is limited only by the claims that follow.

What is claimed is:

1. A method comprising:
applying an adhesive layer on a surface of a flexible printed circuit board; and
applying a hologram on the adhesive layer.

2. The method of claim 1, wherein an adhesive that forms the adhesive layer is applied using adhesive tape.

3. The method of claim 1, wherein an adhesive layer has a uniform thickness.

4. The method of claim 1, further comprising:
applying a layer of transparent polymer on the surface of the flexible circuit board and over the hologram.

5. The method of claim 1, further comprising:
applying a layer of transparent polymer on the surface of the flexible circuit board and over the hologram; and
applying a layer of print material over the layer of transparent polymer.

6. The method of claim 1, further comprising:
applying a layer of print material over the hologram; and
applying a layer of transparent polymer on the surface of the flexible circuit board and over the layer of print material.

7. The method of claim 1, wherein the hologram is a security hologram.

8. The method of claim 1, further comprising:
applying a layer of transparent polymer on the surface of the flexible circuit board and over the hologram to form a powered card.

9. The method of claim 1, further comprising:
applying a dynamic magnetic communication device to the surface of the flexible circuit board.

* * * * *